US006986919B2

(12) United States Patent
Hladik et al.

(10) Patent No.: US 6,986,919 B2
(45) Date of Patent: Jan. 17, 2006

(54) COATED MEDIA

(75) Inventors: Molly Hladik, San Diego, CA (US); Richard J McManus, San Diego, CA (US); David Rossing, San Diego, CA (US); Tony Pidding, San Diego, CA (US); Bor-Jiunn Niu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 318 days.

(21) Appl. No.: 10/678,794

(22) Filed: Oct. 3, 2003

(65) Prior Publication Data

US 2004/0067345 A1    Apr. 8, 2004

Related U.S. Application Data

(63) Continuation-in-part of application No. 10/057,015, filed on Jan. 25, 2002, now Pat. No. 6,638,585.

(51) Int. Cl.
*B41B 5/40*    (2006.01)
(52) U.S. Cl. ............... 428/32.22; 428/32.29; 428/32.31; 428/32.35
(58) Field of Classification Search ............ 428/32.22, 428/32.29, 32.31, 32.35
See application file for complete search history.

(56) References Cited

U.S. PATENT DOCUMENTS

| 5,277,965 | A |   | 1/1994  | Malhotra |
|-----------|---|---|---------|----------|
| 5,279,885 | A |   | 1/1994  | Ohmori et al. |
| 5,928,787 | A |   | 7/1999  | Owatari et al. |
| 6,025,111 | A |   | 2/2000  | Schell et al. |
| 6,165,606 | A | * | 12/2000 | Kasahara et al. ........... 428/323 |
| 6,177,239 | B1 | * | 1/2001 | Wang et al. ................ 430/512 |
| 6,436,514 | B1 |   | 8/2002 | Ishiyama et al. |
| 6,465,081 | B2 | * | 10/2002 | Sarkar et al. ............ 428/32.14 |
| 6,495,242 | B1 | * | 12/2002 | Tsuchiya et al. ......... 428/32.24 |
| 6,638,585 | B2 | * | 10/2003 | Niu et al. ................ 428/32.22 |

* cited by examiner

*Primary Examiner*—B. Shewareged

(57) ABSTRACT

The present invention is drawn to compositions and coated substrates wherein a back coating layer can be implemented for use to mitigate ink transfer, surface damage, smudging, and sticking between stacked sheets in output trays of ink-jet ink printers. Specifically, a coated media sheet can comprise a printing surface including an ink-receiving coating formulated to accept an ink-jet ink composition, and an opposing back surface comprising a back coating. The back coating can include an admixture of 0.5 wt % to 75 wt % of a polymeric binder, 5 wt % to 95 wt % of filler particulates having an average particle size from about 0.01 $\mu$m to about 15 $\mu$m, and 3 wt % to 90 wt % of spacer particulates having an average particle size from about 6 $\mu$m to about 500 $\mu$m. In one embodiment, the spacer particulates are larger than the filler particulates.

18 Claims, No Drawings

COATED MEDIA

The present application is a continuation-in-part of U.S. patent application Ser. No. 10/057,015, which was filed on Jan. 25, 2002, now patented as U.S. Pat. No. 6,638,585 B2, the entirety of which is incorporated herein by reference.

FIELD OF THE INVENTION

The present invention is drawn to the area of ink-jet imaging. More specifically, ink-jet prints can be rapidly printed and stacked in a receiving tray without substantial smearing of the printed image or ink transfer to the back of adjacent media stacked therewith. Additionally, these coatings can provide for improved media sheet feed performance.

BACKGROUND OF THE INVENTION

There are several reasons that ink-jet printing has become a popular way of recording images on various media surfaces, particularly paper. Some of these reasons include low printer noise, capability of high speed recording, and multicolor recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, etc.

Media used for ink-jet printing has typically included high-quality or wood-free papers designed to have a high ink absorptivity. These papers are functionally good for ink-jet printing because the ink-jet inks may be absorbed readily and dry quickly. However, such papers often do not allow for a crisp or sharp image. Thus, in order to attain enhanced print quality and image quality as in a photograph, special media has been developed to work with aqueous inks. For example, various coating papers (art paper, coated paper, cast-coated paper, etc.) have been prepared by coating a layer comprising a hydrophilic binder and an inorganic pigment or particulate on a paper substrate. Additionally, recording sheets have been prepared by coating a hydrophilic ink absorptive layer on paper or other supports, e.g., transparent or opaque plastic film supports. An example of such specialty media utilizes a swelling-type ink absorptive layer, e.g., gelatin, polyvinyl alcohol, methyl cellulose, or the like.

Though swellable media provides a relatively good substrate with respect to certain image quality properties, a drawback includes the fact that swellable media requires more dry-time than other types of media. As digital imaging becomes more popular, and inkjet output devices continue to push photo printing speeds, it has become increasingly important for ink-jet prints to be able to be stacked in printer output trays without smearing the printed image or sticking to adjacent media sheets In other words, as a byproduct of rapid printing speeds, printed media must often be stacked before the printed image is sufficiently dry to prevent smearing or ink transfer. Though this problem is especially prevalent when using swellable media, it can be a problem with nearly all other types of media, depending on the ink, substrate, and the speed at which a printer produces and stacks printed media.

SUMMARY OF THE INVENTION

According to the present invention, a coated media sheet can comprise a printing surface including an ink-receiving coating formulated to accept an ink-jet ink composition, and an opposing back surface comprising a back coating. The back coating can include an admixture of 0.5 wt % to 75 wt % of a polymeric binder, 5 wt % to 95 wt % of filler particulates having an average particle size from about 0.01 $\mu$m to about 15 $\mu$m, and 3 wt % to 90 wt % of spacer particulates of a different material than the filler particulates, wherein the spacer particulates have an average particle size from about 6 $\mu$m to about 500 $\mu$m, with the proviso that the spacer particulates are larger than the filler particulates.

In another embodiment, a composite coating material for overcoating at least one side of a media substrate can comprise an admixture of 0.5 wt % to 75 wt % of a polymeric binder, 5 wt % to 95 wt % of filler particulates having an average particle size from about 0.01 $\mu$m to about 15 $\mu$m, and 3 wt % to 90 wt % of spacer particulates of a different material than the filler particulates, wherein the spacer particulates have an average particle size from about 6 $\mu$m to about 500 $\mu$m, with the proviso that the spacer particulates are larger than the filler particulates.

In still another embodiment, a method for preparing a coated media sheet can comprise coating a back side of a media substrate with a back coating and coating a front side of the media sheet with an ink-receiving coating. The back coating can include an admixture of 0.5 wt % to 75 wt % of a polymeric binder, 5 wt % to 95 wt % of filler particulates having an average particle size from about 0.01 $\mu$m to about 5 $\mu$m, and 3 wt % to 90 wt % of spacer particulates of a different material than the filler particulates, wherein the spacer particulates have an average particle size from about 6 $\mu$m to about 500 $\mu$m, with the proviso that the spacer particulates are larger than the filler particulates.

Additional features and advantages of the invention will be apparent from the following detailed description which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

"Polymeric binder" includes any hydrophilic or hydrophobic (or hydrophilic/hydrophobic blend) polymeric material that can be used to bind particulates together to form a coating in accordance with embodiments of the present invention.

"Filler particulates" include particulates that can be included in the back coatings of the present invention to provide mass to the coating compositions, but which typically do not provide significant binding properties or roughness to the coating composition. In one embodiment, these particulates can be from about 0.01 $\mu$m to about 5 $\mu$m in size.

"Spacer particulates" include compositions that provide roughness to the back coatings of the present invention. These spacer particulates are usually of a larger size than other particulates present in the composition, including the hydrophilic polymeric binder and the filler particulates. In one embodiment, these spacer particulates can be from about 6 μm to about 500 μm in size.

"Substrate" or "media substrate" includes any material that can be coated in accordance with an embodiment of the present invention, such as film base substrates, polymeric substrates, conventional paper substrates, photobase substrates, and the like. Further, pre-coated substrates, such as polymeric coated substrates or swellable media, can also be coated in embodiments of the present invention.

With these definitions in mind, a back coating layer has been developed which highly mitigates smudging and sticking between stacked sheets in output trays of ink-jet ink printers. In one embodiment, a coated media sheet can comprise a printing surface including an ink-receiving coating formulated to accept an ink-jet ink composition, and an opposing back surface comprising a back coating. The back coating can include an admixture of a polymeric binder, filler particulates, and spacer particulates. The polymeric binder can be present at from 0.5 wt % to 75 wt %, and in a more detailed embodiment from 5 wt % to 35 wt %. The filler particulates can be present at from 5 wt % to 95 wt % and can have a particle size from about 0.01 μm to about 15 μm. In one embodiment, the filler particulates can be present at from 50 wt % to 80 wt %. The spacer particulates can be of a different material than the filler particulates, can be present at from 3 wt % to 90 wt %, and can have an average particle size from about 6 μm to about 500 μm. In one embodiment, the spacer particulates can be present at from 3 wt % to 15 wt %. In any of the above combinations, the spacer particulates can be configured to be larger than the filler particulates. Additionally, in one embodiment, the ink-receiving coating can comprise a hydrophilic swellable or polymeric coating. In another embodiment, the back coating can provide an average surface roughness greater than about 80 Sheffield units. In a more detailed embodiment, the average surface roughness can be from 280 to 430 Sheffield units.

In another embodiment, a composite coating material for overcoating at least one side of a media substrate can comprise an admixture of 0.5 wt % to 75 wt % of a polymeric binder, 5 wt % to 95 wt % of filler particulates having an average particle size from about 0.01 μm to about 15 μm; and 3 wt % to 90 wt % of spacer particulates of a different material than the filler particulates, wherein the spacer particulates have an average particle size from about 6 μm to about 500 μm. In one embodiment, the filler particulates can be present at from 50 wt % to 80 wt % and/or the spacer particulates can be present at from 3 wt % to 15 wt %. In another embodiment, the spacer particulates can be larger than the filler particulates. In further detail, the composite coating material described above can also be used on the coated media sheet described previously.

In another embodiment, a method for preparing a coated media sheet can comprise coating a back side of a media substrate with a back coating, and coating a front side of the media sheet with an ink-jet ink receiving coating. The back coating can include an admixture of 0.5 wt % to 75 wt % of a polymeric binder, 5 wt % to 95 wt % of filler particulates having an average particle size from about 0.01 μm to about 15 μm, and 3 wt % to 90 wt % of spacer particulates of a different material than the filler particulates, wherein the spacer particulates have an average particle size from about 6 μm to about 500 μm, with the proviso that the spacer particulates are larger than the filler particulates. In one embodiment, the filler particulates can be present at from 50 wt % to 80 wt % and/or the spacer particulates can be present at from 3 wt % to 15 wt %.

With respect to the coated media sheet, composite coating, and method for preparing a coated media sheet as described above, each embodiment includes commonality. For example, the polymeric binders that can be used in each embodiment include polyvinyl alcohols, acrylics, polystyrenes, polyesters, polyvinyl pyrrolidones, polybutadienes, polystyrene/polybutadienes, polyamides, polyurethanes, and combinations thereof. In one embodiment, the polymeric binder can be a hydrophilic polymeric binder, such as polyvinyl alcohol. The use of a hydrophilic polymeric binder can be desired when the ink-receiving coating is also hydrophilic, which can reduce media curl upon coating.

With respect to the filler particulates, any filler particulates that are functional can be used. Examples of such particulates include clays, ground calcium carbonate, precipitated calcium carbonate, barium sulfate, titanium dioxide, silica, aluminum trihydrate, aluminum oxide, boehmite, and combinations thereof. In one embodiment, ground or precipitated calcium carbonate can be an acceptable filler particulate for use, as it is relatively inexpensive to obtain, and provides good bulk properties to the coating composition.

The spacer particulates are typically larger than the filler particulates, and are used to provide a desired roughness to the back coating, once applied. Examples of spacer particulates that can be used include crystalline silica, amorphous silica, polyethylenes, polypropylenes, glass beads, crushed glass, ground calcium carbonate, barium sulfate, titanium dioxide, alumina, polystyrene, and combinations thereof. Polyethylene beads and/or silica beads can be used in one embodiment.

When preparing the coating composition for application to the back surface of a media substrate, several considerations can occur. Knowing in advance the coating thickness of a back coating can be helpful in preparing a coating composition that will exhibit acceptable wet tray stacking. For example, in one embodiment, the back coating thickness to average size of the spacer particulates can be from about 1:1 to 1:3, and in a more detailed embodiment, the ratio can be from about 1:2. To illustrate this, a back coating thickness from 3 μm to 40 μm can be considered. If the back coating is to be about 3 μm thick, e.g., about 3 g/m$^2$, then the spacer particulates can be, on average, from 3 μm to 9 μm. Alternatively, if the back coating is to be 40 μm thick, e.g., about 40 g/m$^2$, then the spacer particulates can be, on average, from 40 μm to 120 μm thick. These ratios are merely exemplary, and should not be construed to limit the invention, as smaller or larger ratios can be used with success. However, if the spacer particulate size gets much smaller than the coating thickness, then the surface roughness can be minimized, thereby reducing the effectiveness of the back coating. Conversely, if the spacer particulate size gets too much larger than the coating thickness, then the compositions can become more difficult to coat on a media substrate. For example, coating dies used for applying coatings can have certain gaps configured to allow the coating material to pass through, and if the particle size is larger than the gap size, then the gap can become clogged.

Additionally, the back coating thickness to ink-receiving coating thickness ratio can also be considered for preparation of a media sheet with desired properties. For example, in one embodiment, the back coating thickness to ink-receiving coating thickness ratio can be from about 1:1 to 3:1, and in another embodiment can be about 2:1. To illustrate, if the ink-receiving layer thickness is 10 μm thick, then the back coating thickness can be from 10 μm to 30 μm thick. Alternatively, if the ink-receiving layer thickness is 5 μm, then the back coating thickness can be from 5 μm to 15 μm.

Thus, in accordance with embodiments of the present invention, the back coating thickness to spacer particulate size can be considered to provide a desired surface roughness, and the back coating thickness to ink-receiving coating thickness can be considered for providing a media sheet weight desired.

Referring specifically to the printing surface or ink-receiving layer, this layer or coating can comprise a swellable coating or other coating configured for photographic printing, such as coatings comprising hydrophilic material when used for aqueous ink-jet reception.

In accordance with embodiments of the present invention, various coating techniques can be implemented by preparing a coating solution/dispersion to be coated on a media substrate. For example, a substrate can be coated by spray coating, dip coating, cascade coating, swirl coating, extrusion hopper coating, curtain coating, air knife coating, cast coating, and/or by using other known coating techniques. The thickness selected for each coated layer can depend upon the particular requirement or application and/or by desired properties, as would be ascertainable by one skilled in the art.

As stated, ink-jet prints can be rapidly printed and stacked in a receiving tray without substantial smearing of the printed image or ink transfer to the back of adjacent media stacked therewith. Additionally, these coatings can provide for improved media sheet feed performance by providing a low static coefficient of friction (from 0.15 to 0.55) and a low kinetic coefficient of friction (0.05 to 0.45) between the back coating of a first coated media sheet and the ink-receiving coating of a second coated media sheet. The coefficient of friction is typically the ratio of the frictional force resisting movement of the surface being tested to the force applied normal to that surface (the weight of the material above that surface). More specifically, the coefficient of static or starting friction is a ratio of the force resisting initial motion of the surfaces to the normal force, and the coefficient of kinetic or sliding friction is the ratio of the force required to sustain the uniform relative movement of the surfaces to the normal force. These coefficient of friction ratios of printing papers can be an indicator of the ease with which the top or bottom sheet of a stack of paper will slide across the succeeding sheet, such as occurs on the infeed of a sheet-fed printer, such as an ink-jet printer. This low coefficient of friction can aid an ink-jet printer in reducing no picks (media sheet not picked up by the printer) and multiple picks (multiple media sheets picked up together by the printer). These and other advantages can be achieved in accordance with embodiments of the present invention.

EXAMPLES

The following examples illustrate various formulations for preparing the coatings for ink-jet ink media substrates of the present invention. The following examples should not be considered as limitations of the invention, but are merely provided to teach how to make the best composite coatings and coated substrates of the present invention based upon current experimental data.

Example 1

A back coating composition was prepared by admixing 20 wt % of 98% hydrolyzed polyvinyl alcohol (about 100,000 Mw), 65 wt % ground calcium carbonate having an average particle size of about 0.01 μm, and 15 wt % polyethylene beads having an average particle size of about 30 μm.

Example 2

A back coating composition was prepared by admixing 10 wt % polyvinyl pyrrolidone (about 500,000 Mw), 80 wt % boehmite having an average particle size of about 6 μm, and 10 wt % silica beads having an average particle size of about 250 μm.

Example 3

A back coating composition was prepared by admixing 50 wt % of 98% hydrolyzed polyvinyl alcohol (about 250,000 Mw), 30 wt % ground calcium carbonate having an average particle size of about 15 μm, and 20 wt % polyethylene beads having an average particle size of about 100 μm.

Example 4

A back coating composition was prepared by admixing 80 wt % polyurethane (about 1,000,000 Mw), 10 wt % precipitated calcium carbonate having an average particle size of about 1 μm, and 10 wt % polyethylene beads having an average particle size of about 50 μm.

Example 5

Each of the compositions described in Examples 1 to 4 was coated on the back side of both photo base and paper base media. Once coated with the back coating, the opposite side was coated with a polyvinyl alcohol ink-receiving layer. Ink-jet produced images were printed on each coated media sheet on the ink-receiving side (printed media). After 90 seconds, the back coating side of unprinted coated media sheets (stacked media) were placed on top of the ink-receiving side of the printed media to test for ink transfer from the printed media to the stacked media, as well as to test for damage that might occur to the printed image as a result of wet stacking. After remaining in contact for about 30 minutes, the printed media sheets and stacked sheets were inspected. Minimal ink transfer to the stacked media as well as minimal image damage on the printed media was observed.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A coated media sheet, comprising:
   a) a printing surface including an ink-receiving coating formulated to accept an ink-jet ink composition, and
   b) an opposing back surface comprising a back coating, said back coating including an admixture of:
      i) 0.5 wt % to 75 wt % of a polymeric binder;
      ii) 5 wt % to 95 wt % filler particulates having an average particle size from about 0.01 μm to about 15 μm; and iii) 3 wt % to 90 wt % of spacer particulates of a different material than the filler particulates, said spacer particulates having an average particle size from about 6 μm to about 500 μm, with the proviso that the spacer particulates are larger than the filler particulates.

2. A coated media sheet as in claim 1, wherein the ink-receiving coating comprises a hydrophilic swellable or polymeric coating.

3. A coated media sheet as in claim 1, wherein the polymeric binder is selected from the group consisting of polyvinyl alcohols, acrylics, polystyrenes, polyesters, polyvinyl pyrrolidones, polybutadienes, polystyrene/polybutadienes, polyamides, polyurethanes, and combinations thereof.

4. A coated media sheet as in claim 3, wherein the polymeric binder is polyvinyl alcohol.

5. A coated media sheet as in claim 1, wherein the polymeric binder is present at from 5 wt % to 35 wt %.

6. A coated media sheet as in claim 1, wherein the filler particulates are selected from the group consisting of clays, ground calcium carbonate, precipitated calcium carbonate, barium sulfate, titanium dioxide, silica, aluminum trihydrate, aluminum oxide, boehmite, and combinations thereof.

7. A coated media sheet as in claim 6, wherein the filler particulates are ground or precipitated calcium carbonate.

8. A coated media sheet as in claim 1, wherein the filler particulates are present at from 50 wt % to 80 wt %.

9. A coated media sheet as in claim 1, wherein the spacer particulates are selected from the group consisting of crystalline silica, amorphous silica, polyethylenes, polypropylenes, glass beads, crushed glass, ground calcium carbonate, barium sulfate, titanium dioxide, alumina, polystyrene, and combinations thereof.

10. A coated media sheet as in claim 9, wherein the spacer particulates are polyethylene beads.

11. A coated media sheet as in claim 9, wherein the spacer particulates are silica beads.

12. A coated media sheet as in claim 1, wherein the spacer particulates are present at from 3 wt % to 15 wt %.

13. A coated media sheet as in claim 1, wherein the back coating provides an average surface roughness from about 280 to 430 Sheffield units.

14. A coated media sheet as in claim 1, wherein the ratio of the back coating thickness to average size of the spacer particulates is from about 1:1 to 1:3.

15. A coated media sheet as in claim 14, wherein the ratio of the back coating thickness to average size of the spacer particulates is about 1:2.

16. A coated media sheet as in claim 1, wherein the ratio of the ink-receiving coating thickness to back coating thickness ratio is from about 1:1 to 1:3.

17. A coated media sheet as in claim 1, wherein the back coating thickness is from about 3 μm to 40 μm.

18. A coated media sheet as in claim 1, wherein the media sheet is configured to have a static coefficient of friction from 0.15 to 0.55 and a dynamic coefficient of friction of 0.05 to 0.45 with respect to a substantially identical media sheet stacked thereon such that each ink-receiving layer of each media sheet faces a common direction.

* * * * *